Aug. 6, 1957  R. B. IMMEL  2,801,768
EXPLOSION-PROOF ENCLOSURE
Filed Dec. 20, 1954
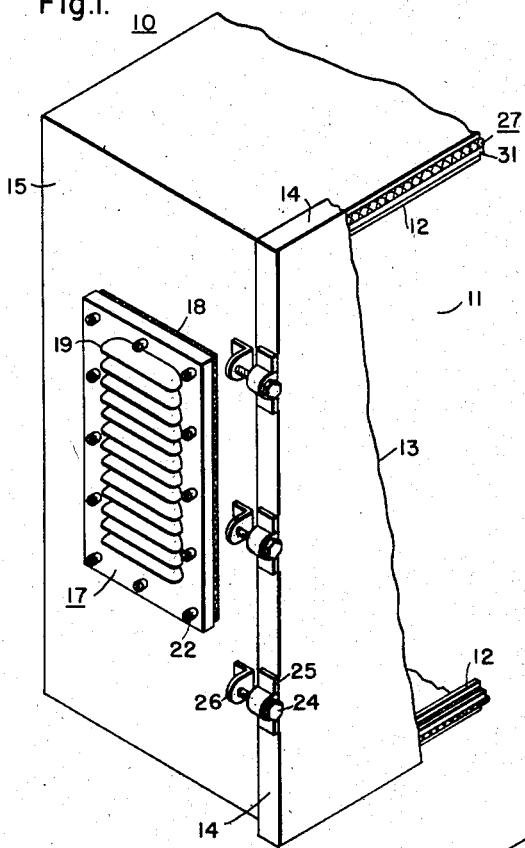
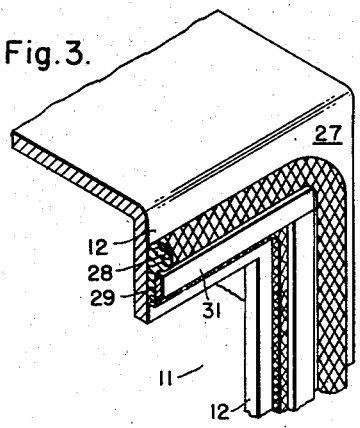
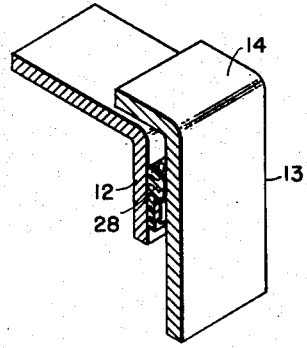
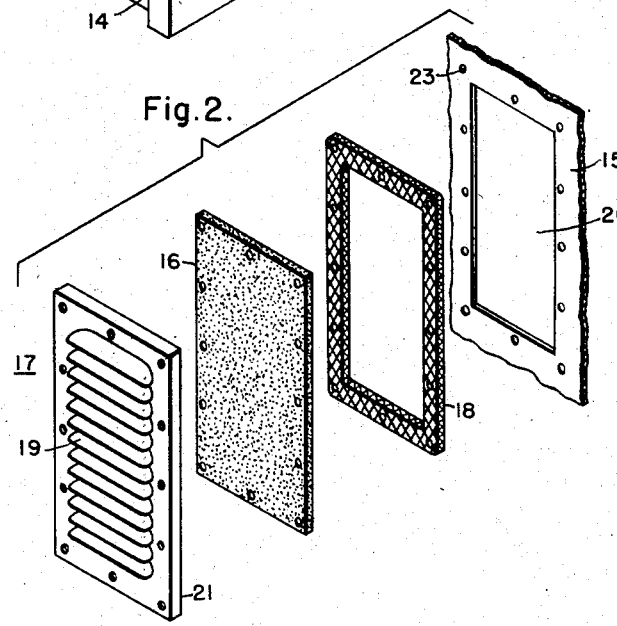
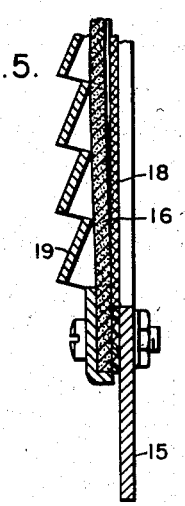
INVENTOR
Ralph B. Immel
BY
ATTORNEY

United States Patent Office 2,801,768
Patented Aug. 6, 1957

2,801,768

EXPLOSION-PROOF ENCLOSURE

Ralph B. Immel, Williamsville, N. Y., assignor to Westinghouse Electric Corporation, East Pittsburgh, Pa., a corporation of Pennsylvania Application December 20, 1954, Serial No. 476,286

5 Claims. (Cl. 220—88)

My invention relates, generally, to metal enclosures and, more particularly, to explosion-proof enclosures for control apparatus.

Heretofore, explosion-proof enclosures for motor starters and other control apparatus have usually been heavy and expensive cast iron or boiler plate structures. The enclosures were constructed in such a manner that they could safely withstand internal explosions which produced relatively high pressures. Enclosures of the foregoing type are satisfactory from a performance standpoint, but they are expensive to manufacture and difficult to handle, particularly in the larger sizes, because of their weight.

An object of my invention, generally stated, is to provide an explosion-proof enclosure which shall be simple in construction, reliable in operation and which may be economically manufactured.

A more specific object of my invention is to provide a porous filter plate for venting an explosion-proof enclosure, thereby enabling it to be manufactured from relatively light sheet metal.

Another object of my invention is to provide resilient and porous sealing means between the box and cover joints to prevent flames from passing out of the enclosure.

A further object of my invention is to protect the porous filter plate against damage from internal explosive forces and external bumping of the plate without appreciably restricting the escapement of gases resulting from an explosion.

Other objects of my invention will be explained fully hereinafter or will be apparent to those skilled in the art.

In accordance with one embodiment of my invention, an opening in a sheet metal box-like enclosure is covered by a porous metal filter plate held in place by a louvered clamping plate which protects the filter plate from internal and external forces. A resilient woven metal gasket is disposed around the edge of the opening between the filter plate and the surface of the box to provide a seal which is not gas-tight, but is flame-proof because of the number of paths through the compressed gasket material. A resilient woven metal gasket is also disposed around an opening for a cover for the enclosure to provide a flame-proof seal between the cover and the box. Thus, gas can escape from the enclosure to prevent high pressures, but flames are cooled by the passageways through the compressed gasket members and the porous filter plate.

For a better understanding of the nature and objects of the invention, reference may be had to the following detailed description, taken in conjunction with the accompanying drawing, in which:

Figure 1 is an isometric view of a portion of an explosion-proof enclosure embodying the principal features of the invention;

Fig. 2 is an exploded view of the parts utilized to provide a vent in the enclosure;

Fig. 3 is an enlarged isometric view of a portion of the gasket around the opening for the cover for the enclosure;

Fig. 4 is a view, similar to Fig. 3, showing the gasket compressed by the cover; and Fig. 5 is an enlarged view, in section, taken through a portion of the vent structure, it being assumed that pressure is developed inside the housing.

Referring to the drawing, and particularly to Fig. 1, the structure shown therein comprises a box-like enclosure 10 which is preferably composed of sheet steel. The side and end members of the box are preferably welded together, one side of the box being left open at 11 with an internal flange 12 surrounding the opening 11. A removable cover 13, having an inwardly extending flange 14, is provided for the opening 11, thereby completing the enclosure.

As explained hereinbefore, the box 10 is utilized for housing motor starters or other control apparatus which is required to open electrical circuits under load. When the control apparatus is utilized in explosive atmospheres, it is necessary to enclose the apparatus in "explosion-proof" housings. Heretofore, these housings have been constructed of heavy castings or rolled steel of sufficient strength to withstand the pressures built up in the housing by an explosion of the gas set off by the arc formed during the interruption of the electric circuit. As previously stated, the present housing is made of relatively light sheet steel and provision is made for venting the housing through flame-proof material, thereby preventing the building up of excessive pressures inside the housing.

As shown most clearly in Fig. 2, an opening 20 is provided in one side wall 15 of the box 10. The opening 20 is covered by a rigid porous sintered metal filter plate 16 which is secured to the side wall 15 by means of a louvered clamping plate 17. A woven metal gasket 18 is disposed around the opening 20 between the filter plate 16 and the side wall 15.

The filter plate 16 may be formed from fine particles or powders of metals of good heat conductivity, such as bronze or a mixture of copper and tin particles. It may be made by well-known processes of powder metallurgy by compressing the metal particles and sintering the compressed mass so that the particles become brazed together leaving multitudinous, tortuous, interconnected pores between the sintered particles. The result is a rigid metal plate of substantial thickness having a multitude of fine interconnected interstices providing many fine paths passing completely through the plate permitting flow of gas through a tortuous path, with the result that the escaping gas is cooled and no flame is emitted. Thus the filter plate 16 provides a very substantial mass of metal having good heat conductivity and a porosity which will cause the plate to function as a flame arrester yet permit the flow of gases therethrough.

The woven metal gasket 18 may be made of stainless steel, bronze, copper or other corrosion resistant metals. A high nickel copper corrosion resistant alloy, available on the market under the trade name "Monel," is particularly suitable for this gasket material as it possesses a relatively high degree of resiliency and springs back to its original shape after clamping.

As shown, the clamping and supporting plate 17 has a plurality of louvers 19 therein. The plate 17 also has an inwardly extending flange 21 around the edge of the plate. The flange 21 increases the rigidity of the plate 17 and the louvers 19 protect the filter plate 16 from injury caused by external bumping of the plate. As shown in Fig. 5, the louvers 19 also provide a series of spaced line supports on the inside of the clamping plate 17 bearing against the outer surface of the porous sintered metal plate 16. This arrangement is provided because the plate 16 of sintered metal particles does not have high mechanical strength and might be fractured by the explosion of inflammable gases within the housing. Thus, the somewhat fragile plate 16 is supported by the louvered plate 17 at spaced intervals distributed over substantially its entire area. The louvers 19 are very effective for this purpose since they are merely bent outwardly, without removing any metal, and present only edge portions backed up by the outwardly bent portions to provide high mechanical strength and at the same time do not block the flow of gas from a very substantial area of the surface of the porous plate and enables the filter plate to withstand any internal pressures that may be built up inside the enclosure 10. Thus, the filter plate 16 is protected without appreciably restricting the flow of gases through the filter plate.

The clamping plate 17 may be attached to the side wall 15 by a plurality of screws 22 which extend through aligned openings in the clamping plate 17, the filter plate 16, the gasket 18 and are threaded into openings 23 in the side wall 15. The woven metal gasket 18 provides a method of clamping the porous filter plate 16 which has an uneven surface to the side wall 15 which also may have a slightly uneven surface. The seal provided by the gasket 18 is not gas-tight, but is flame-proof because of the number of paths through the compressed gasket material. Thus, flames are prevented from escaping through the opening 20.

As previously explained, the removable cover 13 is utilized to provide access to the electrical control equipment inside of the box 10. The flange 14 on the cover 13 increases the rigidity of the cover which may be attached to the box 10 by clamping screws 24. The screws 24 are rotatably retained on the flange 14 by generally U-shaped brackets 25. The screws may be threaded into angle brackets 26 which are secured to the side walls of the box 10.

As previously explained, an internal flange 12 surrounds the opening 11 which is covered by the cover 13. A woven metal gasket 27 having a cylindrical portion 28 and a flat portion 29 formed integrally therewith is disposed on the flange 12 around the opening 11. The gasket 27 may be composed of the same material as the gasket 18. The flat portion 29 of the gasket may be attached to the flange 12 by clamping strips 31 which may be spot welded, bolted or riveted to the flange 12 of the box 10.

As shown in Fig. 4 the cylindrical portion 28 of the gasket 27 is compressed when the cover 13 is drawn toward the box by the fastening screws 24. In this manner a flame-proof seal is provided between the cover 13 and the box 10 without the surfaces of the cover and the box being perfectly smooth or straight. The resiliency of the gasket permits it to seal properly to prevent flames from escaping through the opening 11. As previously explained, the flames are cooled by the intricate passageways between the compressed gasket members.

Since gases are permitted to escape around the openings 11 and 20 through the woven metal gaskets, the possibility of the pressure inside the box becoming too high for the strength of the box is precluded. In other words, the gaskets said the filter plate in venting the enclosure.

It will be understood that it is not necessary to utilize the particular box structure shown in the present drawing. Thus, the box may have an external flange instead of an internal flange around the opening 11. Also, the gasket 27 may be installed on the inside of the cover 13 instead of on the flange 12 as shown. Other variations in the box structure may be made if desired.

From the foregoing description it is apparent that I have provided a simple, reliable and relatively inexpensive means for adequately venting and sealing the box which makes it possible to utilize relatively light sheet metal in constructing an explosion-proof enclosure. The utilization of resilient woven metal gaskets around the openings in the enclosure prevent flames from escaping from the enclosure, but permit gases to escape through the gaskets, thereby reducing the internal pressure. Obviously, an explosion-proof enclosure constructed in the manner herein described is lighter in weight than enclosures constructed of heavy cast iron or boiler plate steel.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. An explosion-proof enclosure comprising a sheet-metal box having an opening in one wall thereof, a porous metal filter plate having multitudinous, tortuous, interconnected pores formed between sintered particles covering said opening, a woven metal gasket disposed around said opening between the filter plate and the outer surface of the wall, and a louvered clamping plate covering said filter plate and secured to the wall of the box.

2. An explosion-proof enclosure comprising a sheet-metal box having an opening in one wall thereof, a porous metal filter plate having multitudinous, tortuous, interconnected pores formed between sintered particles covering said opening, and a louvered clamping plate covering said filter plate and secured to the wall of the box, said louvered plate providing a series of spaced line supports on the inner side of the louvers and at the outer surface of the filter plate, and a resilient porous metal gasket disposed around said opening and compressed between the filter plate and the outer surface of the wall.

3. An explosion-proof enclosure comprising a sheet-metal box having an opening in one wall thereof, a porous metal filter plate of heat conductive sintered metal particles with tortuous, interconnected pores between the particles covering said opening, a woven metal gasket disposed around said opening between the filter plate and the outer surface of the wall, a louvered clamping plate having an inwardly extending flange enclosing said filter plate, said clamping plate being secured to the wall of the box to retain the filter plate and the gasket in position, and said louvered plate providing a series of spaced line supports on the inner side of the louvers and at the outer surface of the filter plate.

4. An explosion-proof enclosure comprising a sheet-metal box having an opening in one wall thereof, a porous metal filter plate of heat conductive sintered metal particles with tortuous, interconnected pores between the particles covering said opening, a woven metal gasket disposed around said opening between the filter plate and the outer surface of the wall, a louvered clamping plate covering said filter plate and secured to the wall of the box, an inwardly extending flange around the edge of the clamping plate, and said flange encompassing said filter plate.

5. An explosion-proof enclosure comprising a sheet-metal box having an opening in one wall thereof, a porous metal filter plate having multitudinous, tortuous, interconnected pores formed between sintered particles covering said opening, a woven metal gasket disposed around said opening between the filter plate and the outer surface of the wall, a louvered clamping plate covering said filter plate and secured to the wall of the box, an inwardly extending flange around the edge of the clamping plate, and said flange encompassing said filter plate but not said gasket, whereby gases are permitted to escape from said enclosure through said filter plate and said gasket.

References Cited in the file of this patent

UNITED STATES PATENTS

| | | |
|---|---|---|
| 1,310,241 | Kessler | July 15, 1919 |
| 1,628,199 | Schmidt et al. | May 10, 1927 |
| 1,669,839 | Pew | May 15, 1928 |
| 1,862,703 | Oven | June 14, 1932 |
| 2,235,663 | Bachmann | Mar. 18, 1941 |
| 2,528,738 | Calkins et al. | Nov. 7, 1950 |
| 2,754,747 | Bertling | July 17, 1956 |

FOREIGN PATENTS

| | | |
|---|---|---|
| 8,969 | Great Britain | A. D. 1886 |